(12) United States Patent
Zheng (10) Patent No.: US 12,078,881 B2
(45) Date of Patent: Sep. 3, 2024

(54) SPLICED DISPLAY DEVICE

(71) Applicant: TCL CHINA STAR OPTOELECTRONICS TECHNOLOGY CO., LTD., Shenzhen (CN)

(72) Inventor: Feng Zheng, Shenzhen (CN)

(73) Assignee: TCL China Star Optoelectronics Technology Co., Ltd., Guangdong (CN)

( * ) Notice: Subject to any disclaimer, the term of this patent is extended or adjusted under 35 U.S.C. 154(b) by 0 days.

(21) Appl. No.: 17/607,249

(22) PCT Filed: Aug. 30, 2021

(86) PCT No.: PCT/CN2021/115202
§ 371 (c)(1),
(2) Date: Oct. 28, 2021

(87) PCT Pub. No.: WO2023/019631
PCT Pub. Date: Feb. 23, 2023

(65) Prior Publication Data
US 2024/0019727 A1    Jan. 18, 2024

(30) Foreign Application Priority Data

Aug. 16, 2021 (CN) .......................... 202110935672.1

(51) Int. Cl.
*G02F 1/1333*       (2006.01)
*G09F 9/33*         (2006.01)

(52) U.S. Cl.
CPC .... *G02F 1/13336* (2013.01); *G02F 1/133388* (2021.01); *G09F 9/33* (2013.01)

(58) Field of Classification Search
CPC .. G02F 1/13336; G02F 1/133388; G09F 9/33; G09G 2300/026
See application file for complete search history.

(56) References Cited

U.S. PATENT DOCUMENTS

2005/0184952 A1*  8/2005  Konno ................. G09G 3/3648
                                                              345/102
2018/0083081 A1   3/2018  Wacyk et al.
(Continued)

FOREIGN PATENT DOCUMENTS

CN    207199233 U    4/2018
CN    110491915 A    11/2019
(Continued)

OTHER PUBLICATIONS

Chinese Office Action issued in corresponding Chinese Patent Application No. 202110935672.1 dated Mar. 24, 2022, pp. 1-7.
(Continued)

*Primary Examiner* — Jia X Pan
(74) *Attorney, Agent, or Firm* — PV IP PC; Wei Te Chung; Zhigang Ma (57) ABSTRACT

The present disclosure provides a spliced display device. The spliced display device includes two liquid crystal display (LCD) panels and a plurality of light-emitting diode (LED) chips. Each LCD panel includes a first frame area. The first frame areas of the two LCD panels are disposed adjacent to each other. The LED chips are disposed in the first frame area.

13 Claims, 7 Drawing Sheets

(56) References Cited

U.S. PATENT DOCUMENTS

2018/0173036 A1* 6/2018 Kim .................. G02F 1/133524
2020/0161405 A1* 5/2020 Kim ........................ G09G 3/32
2021/0096615 A1* 4/2021 Hu .......................... G06F 1/189
2021/0109389 A1* 4/2021 Fan ....................... G02F 1/1362

FOREIGN PATENT DOCUMENTS

| CN | 111290154 A  | 6/2020  |
|----|--------------|---------|
| CN | 211826840 U  | 10/2020 |
| CN | 112634777 A  | 4/2021  |
| CN | 212934616 U  | 4/2021  |
| KR | 20170000575 A| 1/2017  |

OTHER PUBLICATIONS

International Search Report in International application No. PCT/CN2021/115202, mailed on May 12, 2022.
Written Opinion of the International Searching Authority in International application No. PCT/CN2021/115202, mailed on May 12, 2022.

* cited by examiner

SPLICED DISPLAY DEVICE

RELATED APPLICATIONS

This application is a Notional Phase of PCT Patent Application No. PCT/CN2021/115202 having international filing date of Aug. 30, 2021, which claims the benefit of priority of Chinese Patent Application No. 202110935672.1 filed on Aug. 16, 2021. The contents of the above applications are all incorporated by reference as if fully set forth herein in their entirety.

FIELD OF INVENTION

The present disclosure relates to display technologies, and more particularly, to a spliced display device.

BACKGROUND OF INVENTION

With an eye to the display requirements of high-end large screens, such as big data, integrated media, and conferences, major manufacturers are actively deploying splicing technologies. Splicing screens, such as an organic light-emitting diodes (OLED) splicing screen, a sub-millimeter light-emitting diodes (mini-LED) splicing screen, and the like cannot be promoted on a large scale due to cost and reliability issues, and a liquid crystal display (LCD) splicing screen becomes a mainstream product on the market. However, a frame area of the LCD cannot display the picture, causing the visual splicing seam of the LCD splicing screen. Therefore, how to reduce the splicing seams of a spliced display screen has become an urgent expectation of major manufacturers.

SUMMARY OF INVENTION

In view of this, an objective of the present disclosure is to provide a spliced display device capable of reducing splicing seams.

The present disclosure provides a spliced display device, including:
- two spliced LCD panels, wherein each LCD panel includes a first frame area, and the first frame areas of the two LCD panels are disposed adjacent to each other; and
- a plurality of LED chips, disposed in the first frame area.

In an implementation, the each LCD panel includes an array substrate and a counter substrate, the array substrate is disposed opposite to the counter substrate, the counter substrate includes a substrate, and the LED chips are located on a surface of the substrate that is away from the array substrate.

In an implementation, scan lines and data lines are disposed on the substrate, anodes of the LED chips are connected to the data lines, and cathodes of the LED chips are connected to the scan lines.

In an implementation, a thin film transistor array and fan-out lines connected to the thin film transistor array are disposed on the substrate, the LED chips are located on a side of the thin film transistor array that is away from the substrate, and an orthographic projection, on a plane where the thin film transistor array is located, of an emission area formed by the LED chips covers a part of the fan-out lines.

In an implementation, the spliced display device includes a backlight module and a chip on film, wherein the backlight module is disposed on a side of the array substrate that is away from the counter substrate, the chip on film is located between two adjacent first frame areas, one end of the chip on film is connected to one LED chip, and an other end of the chip on film is disposed on a surface of the backlight module that is away from the array substrate.

In an implementation, a groove is provided on a side wall of the substrate, the spliced display device further includes fan-out lines, one ends of the fan-out lines are connected to the LED chips, and other ends of the fan-out lines extend to the groove and are connected to the chip on film.

In an implementation, the spliced display device includes four LCD panels, wherein every two LCD panels are arranged in a row in a first direction, every two LCD panels are arranged in a column in a second direction perpendicular to the first direction, the LCD panel further includes a second frame area intersecting the first frame, the first frame areas of the two LCD panels spliced in the first direction are disposed adjacent to each other, the second frame areas of the two LCD panels spliced in the second direction are disposed adjacent to each other, and the LED chips are further disposed in the second frame area.

In an implementation, the LCD panel further includes a third frame area and a fourth frame area, the third frame area is opposite to the first frame area, the fourth frame area is opposite to the second frame area, a plurality of source drivers are bound to the third frame area, and a gate driving circuit is disposed in the fourth frame area.

In an implementation, the LCD panel includes a plurality of pixels, and a spacing between two adjacent LED chips is equal to a spacing between two adjacent pixels in the LCD panel.

In an implementation, the LED chips are blue LED chips, the spliced display device includes a packaging layer configured to package the LED chips, the packaging layer includes a first package and a second package, a red quantum dots color filter (QDCF) is disposed on a surface of the first package that faces the LED chips, and a green QDCF is disposed on a surface of the second package that faces the LED chips.

The present disclosure further provides a spliced display device, including:
- four spliced LCD panels, wherein every two LCD panels are arranged in a row in a first direction, every two LCD panels are arranged in a column in a second direction perpendicular to the first direction, each LCD panel includes a first frame area and a second frame area intersecting the first frame, the first frame areas of the two LCD panels spliced in the first direction are disposed adjacent to each other, and the second frame areas of the two LCD panels spliced in the second direction are disposed adjacent to each other; and
- a plurality of LED chips, disposed in the first frame area and the second frame area.

Advantageous Effects

According to the spliced display device of the present disclosure, LED chips are disposed in the frame area where the two LCD panels are spliced to display images, so as to reduce the splicing seam of the spliced display device.

BRIEF DESCRIPTION OF DRAWINGS

To describe the technical solutions in the present disclosure more clearly, the following briefly describes the accompanying drawings required for describing the implementations. Apparently, the accompanying drawings in the following description show merely some embodiments of the present disclosure, and a person skilled in the art may still derive other drawings according to such accompanying drawings without creative efforts.

FIG. 1 is a schematic top view of a spliced display device according to a first implementation of the present disclosure.

DETAILED DESCRIPTION OF PREFERRED EMBODIMENTS

The technical solutions in the present disclosure are clearly and completely described below with reference to the accompanying drawings in the implementations of the present disclosure. Apparently, the described implementations are merely some rather than all of the implementations in the present disclosure. All other implementations obtained by a person of ordinary skill in the art based on the implementations of the present disclosure without creative efforts shall fall within the protection scope of the present disclosure.

In the present disclosure, unless otherwise explicitly stipulated and defined, that a first feature is "above" or "under" a second feature may include that the first and second features are in direct contact, or may include that the first and second features are not in direct contact but in contact by using other features therebetween. In addition, that the first feature is "above", "over", or "on" the second feature may include that the first feature is directly above and obliquely above the second feature, or may merely indicate that the horizontal height of the first feature is higher than that of the second feature. That the first feature is "below", "under", and "beneath" the second feature may include that the first feature is right below the second feature and at an inclined bottom of the second feature, or may merely indicate that the horizontal position of the first feature is lower than that of the second feature.

Figure 1:
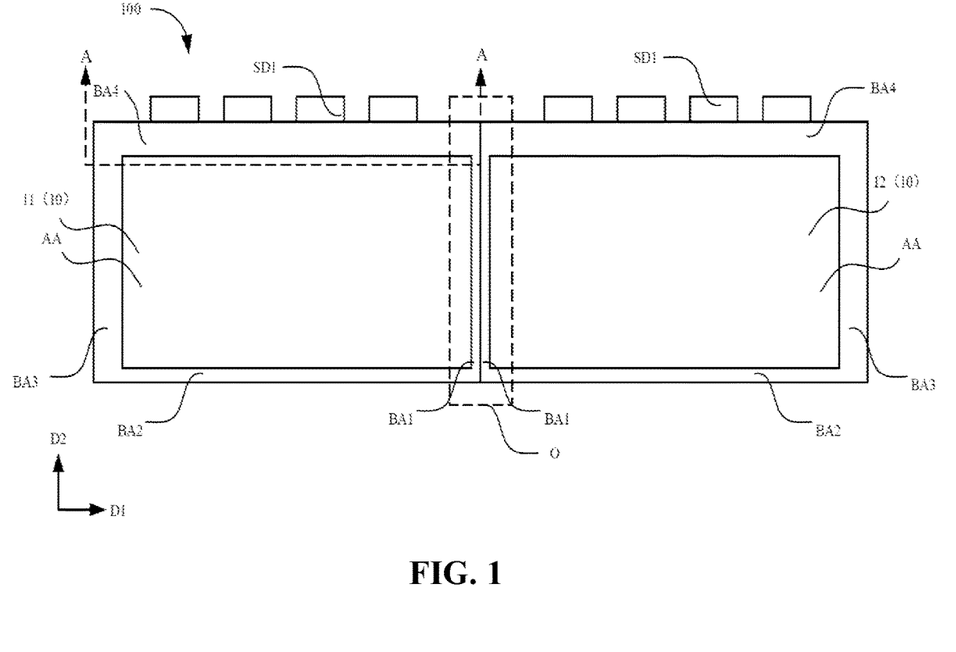

Referring to FIG. 1, a spliced display device 100 in a first implementation of the present disclosure includes two spliced LCD panels 10: a first LCD panel 11 and a second LCD panel 12. It should be noted that when the common points of the first LCD panel 11 and the second LCD panel 12 are described, the LCD panels 10 are used instead of the first LCD panel 11 and the second LCD panel 12 for description. Each LCD panel 10 includes a display area AA and a first frame area BA1, a second frame area BA2, a third frame area BA3, and a fourth frame area BA4 surrounding the display area AA. The first frame area BA1 is opposite to the third frame area BA3, and the second frame area BA2 is opposite to the fourth frame area BA4. The second frame area BA2 intersects the first frame area BA1 and the third frame area BA3, and the fourth frame area BA4 also intersects the first frame area BA1 and the third frame area BA3.

The first frame areas BA1 of the two LCD panels 10 are disposed adjacent to each other. That is, the first frame area BA1 is a frame where the two LCD panels 10 are spliced. No driving chip or driving circuit is disposed in the first frame area BA1. No driving chip or driving circuit is disposed in the second frame area BA2. A gate driving circuit, for example, a gate driver on array (GOA) circuit may be disposed in the third frame area BA3. A plurality of source drivers SD of the LCD panel 10 may be bound to the fourth frame area BA4. It may be understood that, in the implementation, as long as no driving chip or driving circuit is disposed in the first frame area BA1, the driving chip or driving circuit may be disposed in at least one of the second frame area BA2, the third frame area BA3, and the fourth frame area BA4. Since no driving circuit and driving chip is disposed in the first frame area BA1, a width of the first frame area is narrower than that of the third frame area BA3 and the fourth frame area BA4 equipped with a driving circuit or driver. Therefore, the two LCD panels 10 may be spliced at the first frame areas BA1.

Optionally, the first LCD panel 11 and the second LCD panel 12 are arranged in a first direction D1. The first direction D1 may be a horizontal direction. The two spliced LCD panels 10 have a symmetrical structure. For the first LCD panel 11, the first frame area BA1 is a right frame, the second frame area BA2 is a lower frame area, the third frame area BA3 is a left frame area, and the fourth frame area BA4 is an upper frame area. For the second LCD panel 12, the first frame area BA1 is a left frame, the second frame area BA2 is a lower frame area, the third frame area BA3 is a right frame area, and the fourth frame area BA4 is an upper frame area. Certainly, the first LCD panel 11 and the second LCD panel 12 may also be arranged in a second direction D2 perpendicular to the first direction D1, that is, in a vertical direction. In this case, for the first LCD panel 11, the first frame area BA1 is a lower frame, and the third frame area BA3 is an upper frame area. For the second LCD panel 12, the first frame area BA1 is an upper frame, and the third frame area BA3 is a lower frame area.

During the display of the display area AA, the two first frame areas BA1 of the two LCD panels 10 present black, resulting in visual splicing seams. In this regard, LED chips 30 are disposed in the first frame areas BA1 of the spliced display device 100 provided in the present disclosure. In detail, LED chips 30 may be disposed in both the first frame areas BA1 of the two LCD panels 10, or LED chips 30 may be disposed in the first frame area BA1 of one of the two LCD panels 10. The LED chips 30 is combined with the LCD panel 10 to display a complete picture. The LED chips 30 may be mini-LED chips or micro-LED chips.

According to the spliced display device 100 of the present disclosure, LED chips 30 are disposed in the frame area where the two LCD panels 10 are spliced to display images, so as to reduce and eliminate the splicing seam of the spliced display device. Optionally, signals may be simultaneously transmitted to the LCD panels 10 and the LED chips 30 using a network cable and a receiving card, so that the LED chips 30 display continuous images with the display area AA of the LCD panel 10 to maintain the display continuity. Since the LCD display panels have better reliability than that of OLED, micro-LED, and mini-LED display panels, and have lower costs than that of OLED, micro-LED, and mini-LED display panels, the spliced display device 100 of the present disclosure uses the LCD display panels as main display panels provided with a small number of LED chips 30 in the frame area. Therefore, a spliced display device 100 with high reliability and low costs is obtained.

Figure 2:
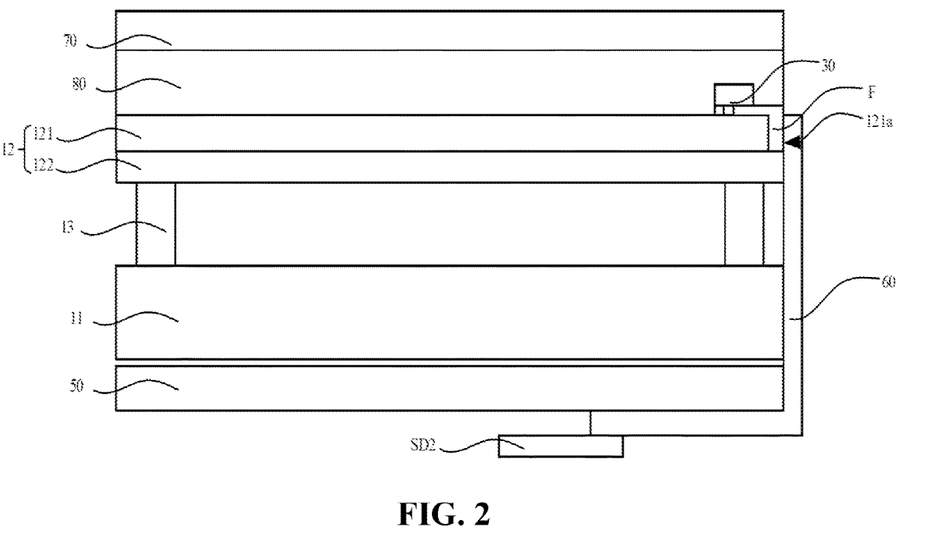
FIG. 2 is a cross-sectional view of the spliced display device of FIG. 1 taken along line A-A.

Referring to FIG. 2, the LCD panel 10 includes an array substrate 11, a counter substrate 12, and a sealant 13 and liquid crystals (not shown) located between the array substrate 11 and the counter substrate 12. The array substrate 11 is disposed opposite to the counter substrate 12. The counter substrate 12 includes a substrate 121, a color filter layer 122 disposed on a surface of the substrate 121 that is close to the array substrate 11, and the like. The substrate 121 may be made of plastic or glass. The LED chips 30 are disposed on a surface of the substrate 121 that is away from the array substrate 11, that is, an upper surface of the substrate 121. When the LED chips 30 are mini-LED chips, the LED chips may be formed on the substrate 121 by means of the surface mount technology (SMT) or die bonding. When the LED chips 30 are micro-LED chips, the LED chips may be fixed to the substrate 121 using a mass transfer method. By disposing the LED chips 30 on the glass or plastic substrate 121, the original structure of the LCD panel 10 may be used to dispose the LED chips 30. In addition, since the technology of forming the LED chips 30 on glass or plastic is relatively mature, the difficulty of the manufacturing process of the spliced display device of the present disclosure can be reduced.

Figure 3:
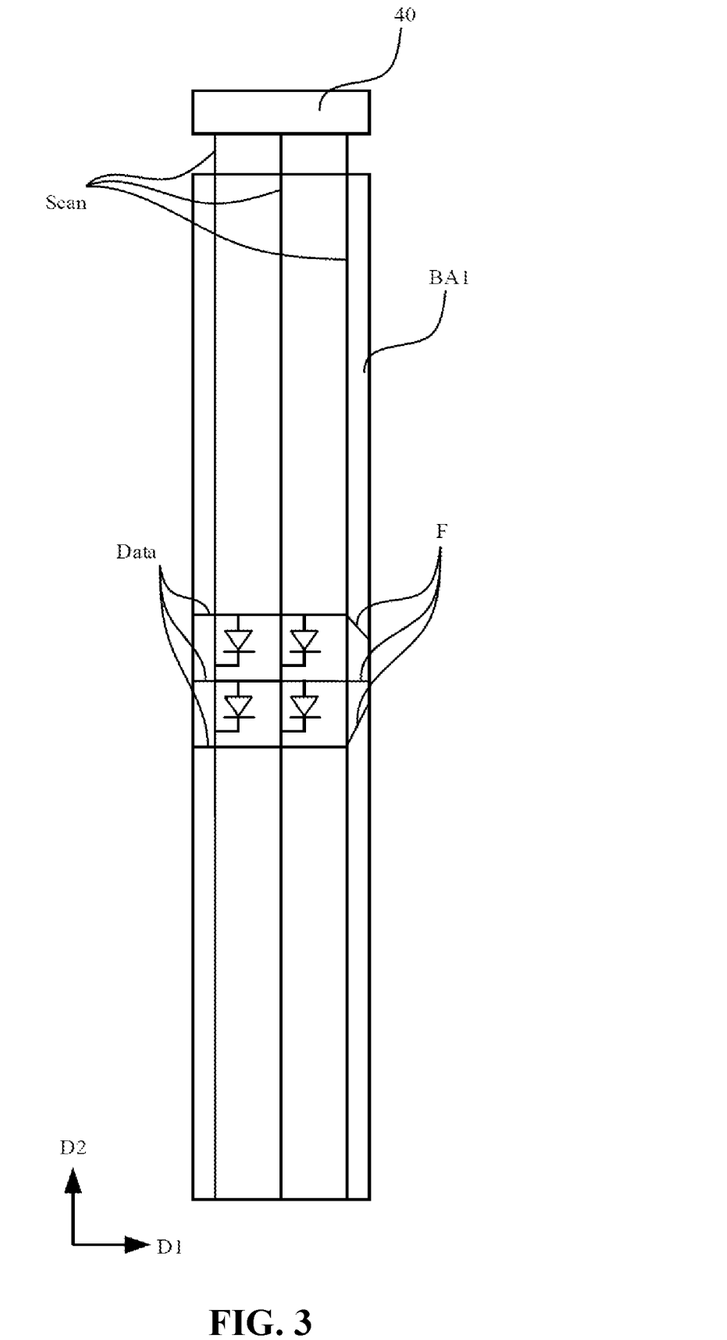
FIG. 3 is a schematic top view of two first frame areas of the spliced display device of FIG. 1.

Optionally, referring to FIG. 3, the LED chips 30 may adopt a passive matrix (PM) driving mode. In detail, a plurality of scan lines Scan and a plurality of data lines Data are disposed in the first frame area BA1. The plurality of data lines Data extend in a first direction D1 and are arranged at intervals in a second direction D2. A plurality of fan-out lines F are further disposed in the first frame area BA1. Each fan-out line F is connected to one data line Data, converges with one fan-out line F as the center, and then is connected to a source driver (not shown). The plurality of scan lines Scan extend in the second direction D2 and are arranged at intervals in the first direction D1. A gate driver 40 configured to drive the LED chips 30 is further disposed in the fourth frame area BA4. The plurality of scan lines Scan are connected to the gate driver 40. Anodes of the LED chips 30 are connected to the data lines Data, and cathodes of the LED chips 30 are connected to the scan lines Scan. Since the PM driving mode does not require thin film transistors to be disposed, and only requires the data lines Data and the scan lines Scan to be disposed, the driving circuit is greatly simplified, and the manufacturing difficulty and manufacturing costs are reduced. On the other hand, the LED chips 30 that are driven using the PM driving mode are sufficient to satisfy the display resolution of the frame area.

Referring to FIG. 2 again, a plurality of source drivers SD2 of the LED chips 30 are bound using a side binding technology. In detail, the spliced display device 100 includes a backlight module 50 and a chip on film 60. The backlight module 50 is disposed on a side of the array substrate 11 that is away from the counter substrate 12 and is configured to provide backlight for the LCD panel 10. In detail, each panel 10 corresponds to one backlight module 50. The chip on film 60 is located between two adjacent first frame areas BA1, that is, located between two adjacent LCD panels 10 and the backlight module 50. One end of the chip on film is connected to the LED chip 30, and an other end of the chip on film is disposed on a surface of the backlight module 50 that is away from the array substrate 11. Optionally, a groove 121a is formed on a side wall of the first frame area BA1. In more details, a plurality of grooves 121a are formed on the side wall of the substrate 121 of the first frame area BA1 by means of laser drilling or mechanical drilling. One ends of the plurality of fan-out lines F are connected to the LED chips 30 via the data lines Data, and other ends of the fan-out lines extend to an edge of the first frame area BA1, are disposed in the groove 121a to form a binding pad, and are connected to the chip on film 60. The fan-out lines F may be made of copper. The chip on film 60 is connected to the binding pad formed by the fan-out lines F in the groove 121a, and extends along a gap between the two first frame areas BA1, and is bent to the surface of the backlight module 50 that is away from the array substrate 11. Then, the plurality of source drivers SD2 of the LED chips 30 are bound. It may be understood that the binding manner of the chip on film 60 is not limited to the above manner. For example, the chip on film 60 may be bound by grinding the first frame area BA1 to expose the signal line to form a binding pad. FIG. 2 shows the method for binding the first LCD panel 11 to the chip on film. The method for binding the second LCD panel 12 to the chip on film is also same, and the description thereof is omitted. In the present implementation, the plurality of source drivers SD2 of the LED chips 30 are bound using a side binding technology. In this way, a non-display area generated due to disposing of the LED chips 30 can be narrowed.

Further, the spliced display device 100 further includes a cover plate 70 and an optical adhesive 80. The cover plate 70 is disposed on a side of the LCD panel 10 that is away from the backlight module 50. The optical adhesive 80 is used to attach the cover plate 70 to the LCD panel 10 and the LED chips 30. The optical adhesive 80 is a transparent colloid and serves as a flat layer to flatten the surface of the substrate 121 on which the LED chips 30 are disposed, so as to facilitate the disposing of the cover plate 70.

Figure 4:
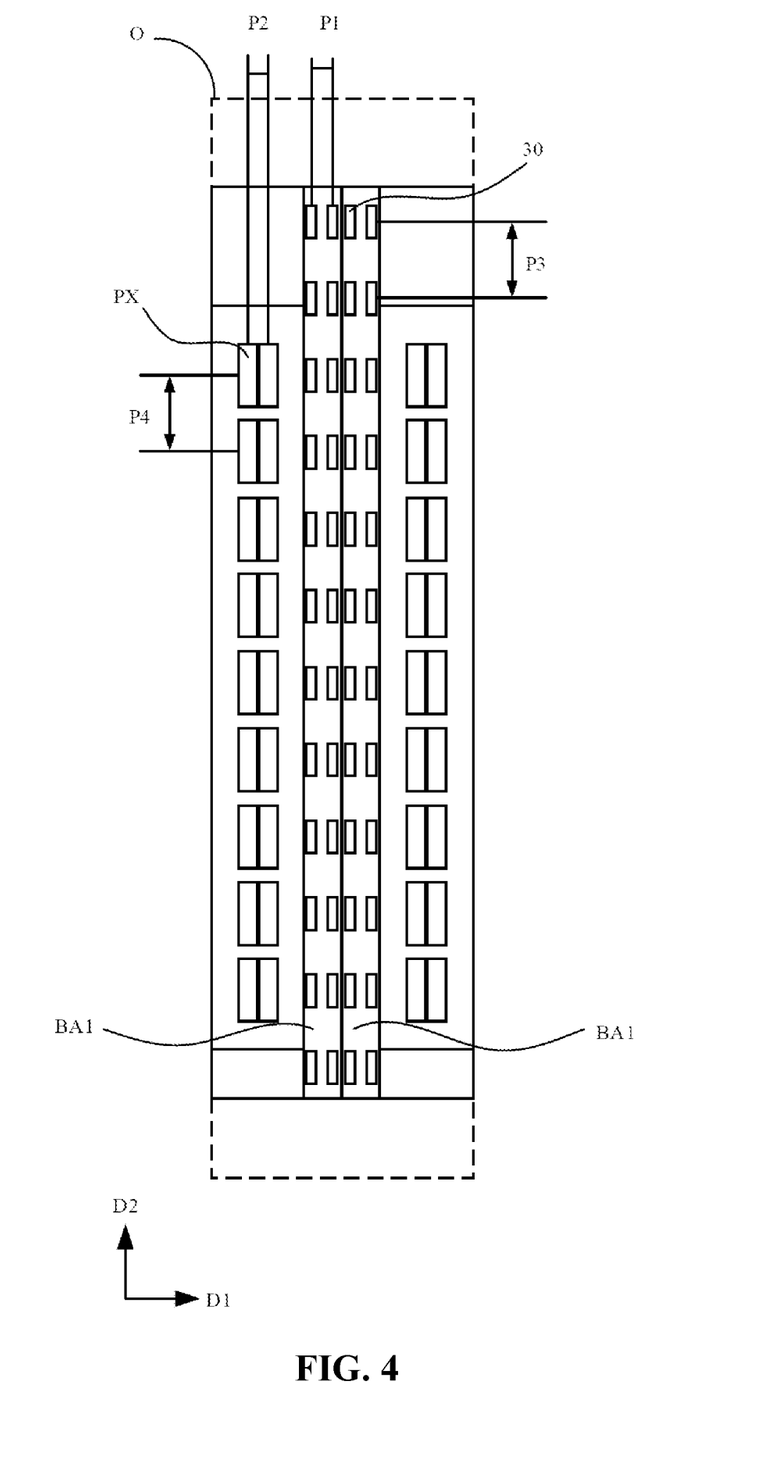
FIG. 4 is a schematic enlarged view of part O of the spliced display device of FIG. 1.

Referring to FIG. 4, optionally, a plurality of LED chips 30 are arranged in an array. The LCD panel 10 includes a plurality of sub-pixels PX. The plurality of sub-pixels PX are also arranged in an array. A spacing between two adjacent LED chips 30 is equal to a spacing between two adjacent sub-pixels PX in the LCD panel 10. The "spacing" in the specification refers to a spacing between centers of two adjacent LED chips 30 or a spacing between centers between two adjacent sub-pixels PX. The "spacing" includes a transverse spacing and a vertical spacing. The transverse spacing refers to a spacing between two adjacent LED chips 30 or sub-pixels PX in a horizontal direction, that is, a first direction D1. The vertical spacing refers to a spacing between two adjacent LED chips 30 or sub-pixels PX in a vertical direction, that is, a second direction D2. A transverse spacing P1 between two adjacent LED chips 30 is equal to a transverse spacing P2 between two adjacent sub-pixels PX in the LCD panel 10. A vertical spacing P3 between two adjacent LED chips 30 is equal to a vertical spacing P4 between two adjacent sub-pixels PX in the LCD panel 10. If the spacing between two adjacent LED chips 30 is inconsistent with the spacing between two adjacent sub-pixels PX in the LCD panel 10, display mura may be generated at the splice. By keeping the spacing between two adjacent LED chips consistent with the spacing between two adjacent sub-pixels, the mura at the splice can be reduced. Further, a plurality of LED chips 30 are arranged in a row in the first direction D1. Each row of LED chips 30 is aligned to a row of sub-pixels PX of the LCD panel 10. In detail, a center of each row of LED chips 30 and a center of a row of sub-pixels PX of the LCD panel are on a same straight line to further prevent mura at the splicing seam.

Figure 5:
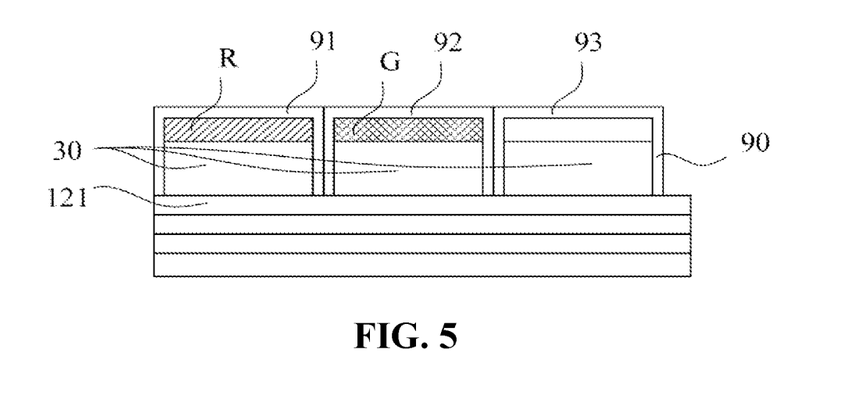
FIG. 5 is a schematic diagram of a structure of LED chips and a packaging layer of the spliced display device of FIG. 1.

Optionally, refer to FIG. 5, the LED chips 30 are blue LED chips 30. The spliced display device 100 further includes a packaging layer 90. The packaging layer 90 is used to package the LED chips 30. The packaging layer 90 includes a first package 91, a second package 92, and a third package 93. Each package surrounds one LED chip 30 from a top of the substrate 121. A red QDCF R is disposed on a surface of the first package 91 that faces the LED chip 30, and a green QDCF G is disposed on a surface of the second package 92 that faces the LED chip 30. No QDCF is disposed on a surface of the third package 93 that faces the LED chip 30, or only a transparent film layer is disposed. Since directly using the three-color LED chip 30 costs much, in the present disclosure, the blue LED chips 30 are used to cooperate with the QDCF to convert colors, and then color mixing is performed. If the quantum dots filter is used directly, because the QD filter cannot achieve complete color conversion, and the color purity is not high, the CF is required for filtration. In the present disclosure, the QDCF is used for conversion, so as to improve the color purity and reduce the thickness of the film.

Figure 6:
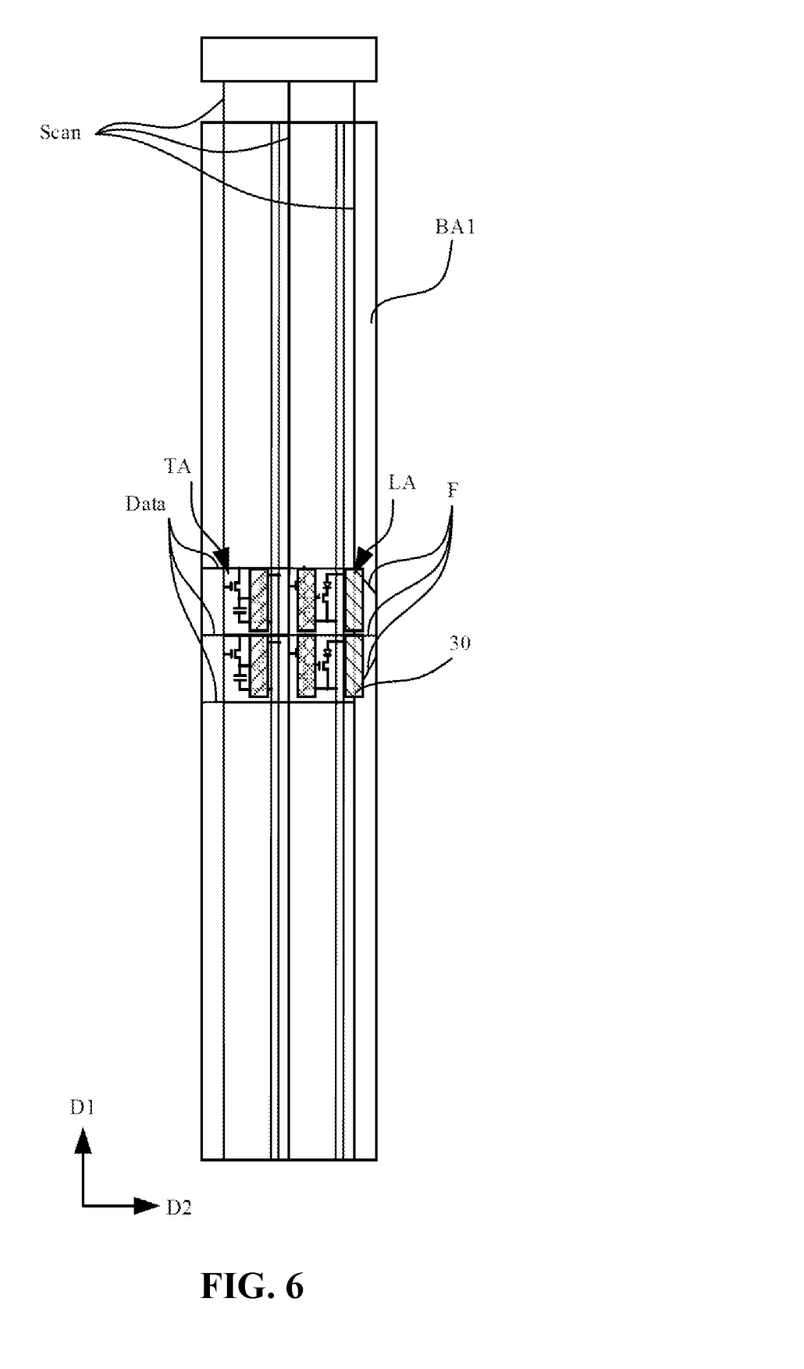
FIG. 6 is a schematic top view of two first frame areas of a spliced display device according to a second implementation of the present disclosure.

Referring to FIG. 6, a difference between the spliced display device 100 of the second implementation of the present disclosure and that of the first implementation lies in that:

the spliced display device 100 according to the second implementation of the present disclosure is driven using an active matrix driving mode. A thin film transistor array TA and scan lines Scan and data lines Data connected to the thin film transistor array TA are disposed on the substrate 121. A plurality of fan-out lines F are further disposed on an upper surface of the substrate 121. Each fan-out line F is connected to one data line Data, converges with one fan-out line F as the center, and then is connected to a source driver (not shown). The LED chips 30 are located on a side of the thin film transistor array TA that is away from the substrate 121, and an orthographic projection, on a plane where the thin film transistor array TA is located, of an emission area LA formed by the LED chips 30 covers a part of the fan-out lines F.

For the LED chip 30 of the present implementation, an outer lead bonding (OLB) area can be narrowed to several tens of microns by disposing the part of the fan-out lines F below an emission area LA formed by the LED chips 30, thereby reducing a non-display area generated that is used for driving the LED chips 30.

Figure 7:
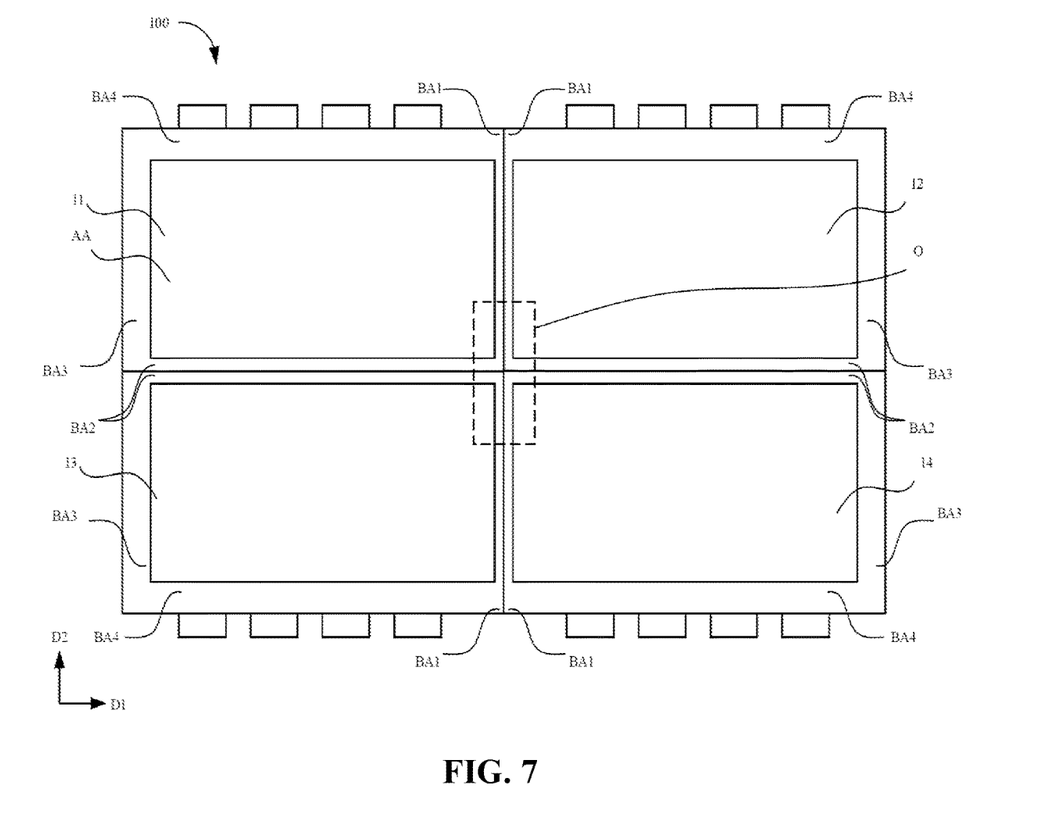
FIG. 7 is a schematic top view of a first frame area of a spliced display device according to a third implementation of the present disclosure.
Figure 8:
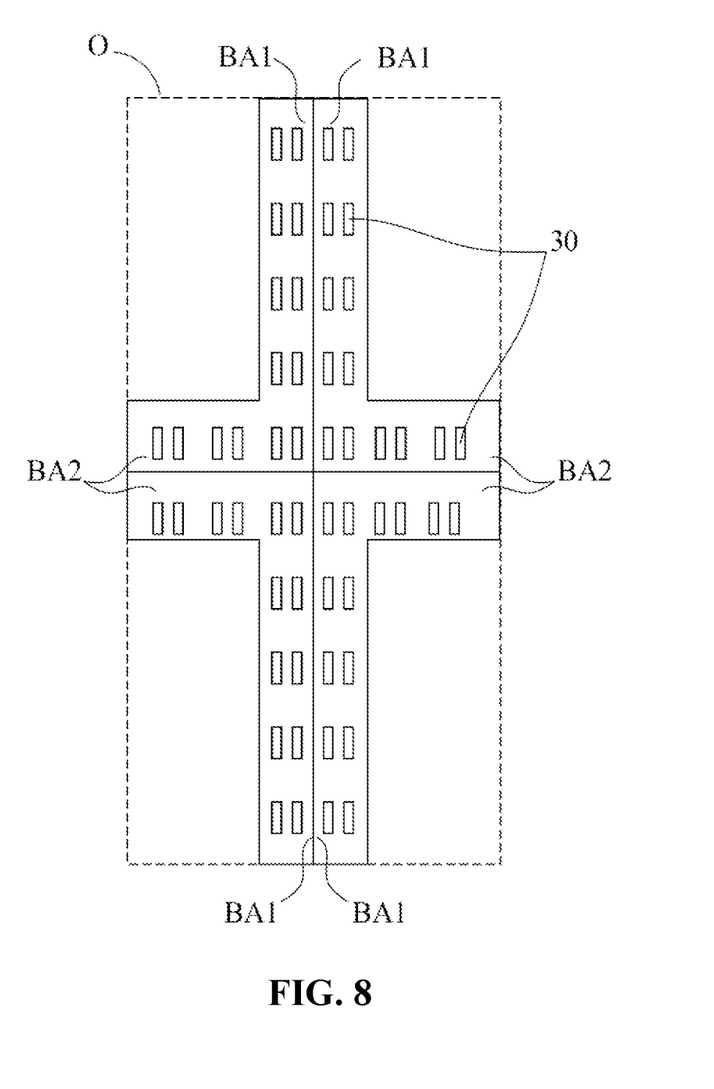
FIG. 8 is a schematic enlarged view of part O of the spliced display device of FIG. 7.

Referring to FIGS. 7 and 8, a difference between the spliced display device 100 of the third implementation of the present disclosure and that of the first implementation lies in that:

The spliced display device 100 includes four LCD panels 10. The four LCD panels are arranged in a 2×2 manner. In detail, every two LCD panels 10 are arranged in a row in a first direction D1, and every two LCD panels 10 are arranged in a column in a second direction D2 perpendicular to the first direction D1. First frame areas BA1 of the two LCD panels 10 that are spliced in the first direction D1 are disposed adjacent to each other. Second frame areas BA2 of the two LCD panels 10 that are spliced in the second direction D2 are disposed adjacent to each other. In detail, the spliced display device 100 includes a first LCD panel 11, a second LCD panel 12, a third LCD panel 13, and a fourth LCD panel 14. The first LCD panel 11 and the second LCD panel 12 are spliced in the first direction D1, and the third LCD panel 13 and the fourth LCD panel D2 are spliced in the first direction D1. The third LCD panel 13 and the first LCD panel 11 are spliced in the second direction D2, and the fourth LCD panel D2 and the second LCD panel 12 are spliced in the second direction D2. The first LCD panel 11 and the fourth LCD panel 14 have a same structure, and the second LCD panel 12 and the third LCD panel 13 have a same structure. The first LCD panel 11 and the second LCD panel 12 have a symmetrical structure. No driving chip or driving circuit is disposed in both the first frame area BA1 and the second frame area BA2. A gate driving circuit may be disposed in the third frame area BA3. Fan-out lines of the data lines Data may be disposed in the fourth frame area BA4, and a plurality of source drivers SD are bound to the fourth frame area. As a result, the four LCD panels 10 are spliced in the frame area where no driving chip or driving circuit is disposed, thereby reducing the splicing seam. In addition, the LED chips 30 are further disposed in the second frame area BA2. For the structure of the LED chip 30, the packaging layer, scan lines, data lines, and the like in the second frame area BA2, reference may be made to the structure of the first frame area BA1 described in the first implementation. In addition, the LED chips 30 in the second frame area BA2 may also be driven using a PM and an AM. For details, refer to the LED chips 30 of the first frame area BA1 in the first implementation and the second implementation, and the description is omitted herein.

According to the spliced display device of the present disclosure, LED chips are disposed in the frame area where the two LCD panels are spliced to display images, so as to reduce or eliminate the splicing seam of the spliced display device.

According to an implementation of the present disclosure, the LED chips are driven using the PM. In this way, not only the requirements for the resolution of the frame area can be satisfied, but also the driving circuit can be simplified, thereby reducing the manufacturing difficulty and manufacturing costs.

According to an implementation of the present disclosure, the source drivers of the LED chips are bound using a side binding technology. In this way, a non-display area generated due to disposing of the LED chips can be narrowed.

According to an implementation of the present disclosure, the spacing between two adjacent LED chips is equal to the spacing between two adjacent sub-pixels in the LCD panel, thereby reducing the mura at the spliced frame areas.

According to an implementation of the present disclosure, the LED chips are driven using the AM, and the part of the fan-out lines is disposed below the LED chip. In this way, a non-display area generated due to disposing of the LED chips can be narrowed.

According to an implementation of the present disclosure, a spliced display device including four LCD panels arranged in a 2×2 manner can be provided.

The implementations of the present disclosure are described in detail above. The principles and implementations of the present disclosure are described by using specific examples in this specification, and the descriptions of the foregoing implementations are merely intended to help understand the present disclosure. Meanwhile, a person skilled in the art may make modifications to the specific implementations and application scopes according to the ideas of the present disclosure. In conclusion, the content of this specification should not be construed as a limitation to the present disclosure.

What is claimed is:

1. A spliced display device, comprising:
   two spliced liquid crystal display (LCD) panels, wherein each LCD panel comprises a first frame area, and the first frame areas of the two LCD panels are disposed adjacent to each other; and a plurality of light-emitting diode (LED) chips disposed in the first frame area, wherein each of the LCD panels comprises an array substrate and a counter substrate, the array substrate is disposed opposite to the counter substrate, the counter substrate comprises a substrate, and the LED chips are located on a surface of the substrate away from the array substrate, wherein the spliced display device comprises a backlight module and a chip on film, wherein the backlight module is disposed on a side of the array substrate away from the counter substrate, the chip on film is located between two adjacent first frame areas, one end of the chip on film is connected to the LED chips, and another end of the chip on film is disposed on a surface of the backlight module away from the array substrate, wherein a groove is provided on a side wall of the substrate, the spliced display device further comprises a plurality of fan-out lines, one ends of the fan-out lines are connected to the LED chips, and another ends of the fan-out lines extend into the groove and are connected to the chip on film.

2. The spliced display device as claimed in claim 1, wherein a plurality of scan lines and a plurality of data lines are disposed on the substrate, anodes of the LED chips are connected to the data lines, and cathodes of the LED chips are connected to the scan lines.

3. The spliced display device as claimed in claim 1, wherein a thin film transistor array and a plurality of fan-out lines connected to the thin film transistor array are disposed on the substrate, the LED chips are located on a side of the thin film transistor array away from the substrate, and an orthographic projection of an emission area formed by the LED chips projected on a plane where the thin film transistor array is located covers a part of the fan-out lines.

4. The spliced display device as claimed in claim 1, comprising four spliced LCD panels, wherein every two LCD panels are arranged in a row in a first direction, every two LCD panels are arranged in a column in a second direction perpendicular to the first direction, each LCD panel further comprises a second frame area intersecting the first frame area, the first frame areas of the two LCD panels spliced in the first direction are disposed adjacent to each other, the second frame areas of the two LCD panels spliced in the second direction are disposed adjacent to each other, and the LED chips are further disposed in the second frame area.

5. The spliced display device as claimed in claim 4, wherein each of the LCD panel further comprises a third frame area and a fourth frame area, the third frame area is opposite to the first frame area, the fourth frame area is opposite to the second frame area, a plurality of source drivers is binding to the third frame area, and a gate driving circuit is disposed in the fourth frame area.

6. The spliced display device as claimed in claim 1, wherein the LCD panel comprises a plurality of pixels, and a spacing between any two adjacent LED chips is equal to a spacing between two adjacent pixels in the LCD panel.

7. The spliced display device as claimed in claim 1, wherein the LED chips are blue LED chips, the spliced display device further comprises a packaging layer configured to package the LED chips, the packaging layer comprises a first package and a second package, a red quantum dots color filter (QDCF) is disposed on a surface of the first package that faces the LED chips, and a green QDCF is disposed on a surface of the second package that faces the LED chips.

8. A spliced display device, comprising:
four spliced LCD panels, wherein every two LCD panels are arranged in a row in a first direction, every two LCD panels are arranged in a column in a second direction perpendicular to the first direction, each LCD panel includes a first frame area and a second frame area intersecting the first frame area, the first frame areas of the two LCD panels spliced in the first direction are disposed adjacent to each other, and the second frame areas of the two LCD panels spliced in the second direction are disposed adjacent to each other; and
a plurality of LED chips disposed in the first frame area and the second frame area, wherein each of the LCD panels comprises an array substrate and a counter substrate, the array substrate is disposed opposite to the counter substrate, the counter substrate comprises a substrate, and the LED chips are located on a surface of the substrate away from the array substrate, the spliced display device comprises a backlight module and a chip on film, wherein the backlight module is disposed on a side of the array substrate away from the counter substrate, the chip on film is located between two adjacent first frame areas, one end of the chip on film is connected to the LED chips, and another end of the chip on film is disposed on a surface of the backlight module away from the array substrate, wherein a groove is provided on a side wall of the substrate, the spliced display device further comprises a plurality of fan-out lines, one ends of the fan-out lines are connected to the LED chips, and another ends of the fan-out lines extend into the groove and are connected to the chip on film.

9. The spliced display device as claimed in claim 8, wherein a plurality of scan lines and a plurality of data lines are disposed on the substrate, anodes of the LED chips are connected to the data lines, and cathodes of the LED chips are connected to the scan lines.

10. The spliced display device as claimed in claim 8, wherein a thin film transistor array and a plurality of fan-out lines connected to the thin film transistor array are disposed on the substrate, the LED chips are located on a side of the thin film transistor array away from the substrate, and an orthographic projection of an emission area formed by the LED chips projected on a plane where the thin film transistor array is located covers a part of the fan-out lines.

11. The spliced display device as claimed in claim 8, wherein each of the LCD panel further comprises a third frame area and a fourth frame area, the third frame area is opposite to the first frame area, the fourth frame area is opposite to the second frame area, a plurality of source drivers is binding to the third frame area, and a gate driving circuit is disposed in the fourth frame area.

12. The spliced display device as claimed in claim 8, wherein the LCD panel comprises a plurality of pixels, and a spacing between any two adjacent LED chips is equal to a spacing between two adjacent pixels in the LCD panel.

13. The spliced display device as claimed in claim 8, wherein the LED chips are blue LED chips, the spliced display device further comprises a packaging layer configured to package the LEI) chips, the packaging layer comprises a first package and a second package, a red quantum dots color filter (QDCF) is disposed on a surface of the first package that faces the LED chips, and a green QDCF is disposed on a surface of the second package that faces the LEI) chips.

* * * * *